(12) United States Patent
An et al.

(10) Patent No.: US 10,451,774 B2
(45) Date of Patent: Oct. 22, 2019

(54) SUBSTRATE FOR DISPLAY DEVICE

(71) Applicant: Corning Precision Materials Co., Ltd., Chungcheongnam-do (KR)

(72) Inventors: Jin Soo An, Chungcheongnam-do (KR); Jung Hong Oh, Chungcheongnam-do (KR); Min Seok Kim, Chungcheongnam-do (KR)

(73) Assignee: Corning Precision Materials Co., Ltd. (KR)

( * ) Notice: Subject to any disclaimer, the term of this patent is extended or adjusted under 35 U.S.C. 154(b) by 123 days.

(21) Appl. No.: 15/506,441

(22) PCT Filed: Aug. 27, 2015

(86) PCT No.: PCT/KR2015/008981
§ 371 (c)(1),
(2) Date: Feb. 24, 2017

(87) PCT Pub. No.: WO2016/032253
PCT Pub. Date: Mar. 3, 2016

(65) Prior Publication Data
US 2017/0254928 A1 Sep. 7, 2017

(30) Foreign Application Priority Data
Aug. 27, 2014 (KR) .......................... 10-2014-0112278

(51) Int. Cl.
*G02B 1/14* (2015.01)
*B32B 7/023* (2019.01)
(Continued)

(52) U.S. Cl.
CPC .................. *G02B 1/14* (2015.01); *B32B 7/02* (2013.01); *B32B 7/023* (2019.01); *B32B 17/06* (2013.01);
(Continued)

(58) Field of Classification Search
CPC .............. B32B 7/02; G02B 1/11–1/18; C03C 2217/734; C03C 17/00–17/44
See application file for complete search history.

(56) References Cited

U.S. PATENT DOCUMENTS 6,068,914 A 5/2000 Boire et al.
7,736,728 B2 * 6/2010 Loboda ............. H01L 21/02126
428/216
(Continued)

FOREIGN PATENT DOCUMENTS

JP 2007527328 A 9/2007
JP 2009529715 A 8/2009
(Continued)

OTHER PUBLICATIONS

International Search Report for Application No. PCT/KR2015/008981 dated Nov. 25, 2015.

*Primary Examiner* — Prashant J Khatri
(74) *Attorney, Agent, or Firm* — Lerner, David, Littenberg, Krumholz & Mentlik, LLP

(57) ABSTRACT

The present invention relates to a substrate for a display device and, more particularly, to a substrate for a display device which has excellent durability and also can minimize generation of color shift when being applied to a display device. To this end, the present invention provides a substrate for a display device comprising: a base material; a first coating film formed on the base material; a second coating film which is formed on the first coating film and is formed of a material having a relatively lower refractive index than the first coating film; a third coating film which is formed on the second coating film and is formed of a material having a relatively higher refractive index than the second coating film; a forth coating film which is formed on the third coating film and is formed of a material having a relatively lower refractive index than the third coating film; and a hard coating film which is formed on the fourth coating film and is formed of AlON having a relatively higher refractive index than the forth coating film.

7 Claims, 6 Drawing Sheets

(51) Int. Cl.
 *G06F 3/041* (2006.01)
 *G02B 5/28* (2006.01)
 *B32B 7/02* (2019.01)
 *B32B 17/06* (2006.01)
 *B32B 27/06* (2006.01)

(52) U.S. Cl.
 CPC ............. *B32B 27/06* (2013.01); *G02B 5/286* (2013.01); *G06F 3/041* (2013.01)

(56) References Cited

U.S. PATENT DOCUMENTS

| | | | |
|---|---|---|---|
| 2006/0240266 A1 | 10/2006 | Schicht et al. | |
| 2007/0188871 A1 | 8/2007 | Fleury et al. | |
| 2009/0104385 A1 | 4/2009 | Reymond et al. | |
| 2013/0176615 A1* | 7/2013 | Uefuji | G02B 1/113 |
| | | | 359/359 |

FOREIGN PATENT DOCUMENTS

| | | |
|---|---|---|
| KR | 20060058712 A | 5/2006 |
| KR | 20080052842 A | 6/2008 |
| KR | 20110135612 A | 12/2011 |

* cited by examiner

SUBSTRATE FOR DISPLAY DEVICE

CROSS-REFERENCE TO RELATED APPLICATION

This application is a national phase entry under 35 U.S.C. § 371 of International Application No. PCT/KR2015/008981, filed Aug. 27, 2015, published in Korean, which claims priority to Korean Patent Application No. 10-2014-0112278, filed on Aug. 27, 2014, the disclosures of which are incorporated herein by reference.

BACKGROUND OF THE INVENTION

Field of the Invention

The present invention relates to a substrate for a display device, and more particularly, to a substrate for a display device having superior durability and able to minimize color shift when applied to a display device.

Description of Related Art

In response to the emergence of the information society, image display components and devices have been significantly improved and have become widespread. Among such components and devices, image display devices are widespread for use in TVs, personal computer (PC) monitors, and the like. Accordingly, cathode ray tubes (CRTs) representative of traditional display devices are being rapidly substituted with flat panel displays (FPDs) such as liquid crystal displays (LCDs), plasma display panels (PDPs), field emission displays (FEDs) and organic light-emitting displays (OLEDs).

Recently, in response to the introduction of smartphones, the use of touchscreen panels, mainly on mobile display devices, is rapidly increasing. A touchscreen panel is a device which is disposed on the front of a display device. Such a touchscreen panel is designed to output a signal when a user touches the touchscreen panel with a finger or an input device such as a stylus, while viewing the touchscreen panel. In such a touchscreen panel, high mechanical durability is required for the cover substrate considering functions thereof, since it must withstand millions of touches while satisfying the requirement of high light transmittance. Therefore, continuous attempts to fabricate a cover substrate able to realize better durability and optical characteristics have been made.

RELATED ART DOCUMENT

Patent Document 1: Korean Patent Application Publication No. 10-2011-0135612 (Dec. 19, 2011)

BRIEF SUMMARY OF THE INVENTION

Various aspects of the present invention provide a substrate for a display device having superior durability and able to minimize color shift when applied to a display device.

In an aspect of the present invention, provided is a substrate for a display device that includes: a base substrate; a first coating film disposed on the base substrate; a second coating film disposed on the first coating film, the second coating film being formed of a material, the refractive index of which is lower than that of the first coating film; a third coating film disposed on the second coating film, the third coating film being formed of a material, the refractive index of which is higher than that of the second coating film; a fourth coating film disposed on the third coating film, the fourth coating film being formed of a material, the refractive index of which is lower than that of the third coating film; and a hard coat film disposed on the fourth coating film, the hard coat film being formed of AlON, the refractive index of which is higher than that of the fourth coating film.

According to an embodiment of the present invention, the first coating film and the third coating film may be formed of the same material.

The first coating film and the third coating film may be formed of AlON.

The first coating film may be thinnest and the hard coat film may be thickest among the first coating film, the third coating film and the hard coat film.

The thickness of the hard coat film may be equal to at least 10 times the overall thickness of the first to fourth coating films.

The thickness of the hard coat film may range from 1,000 to 3,000 nm.

The second coating film and the fourth coating film may be formed of the same material.

The second coating film and the fourth coating film may be formed of the material, the refractive index of which ranges from 1.35 to 1.6.

The substrate may further include a fifth coating film disposed on the hard coat film, the fifth coating film being formed of a material, the refractive index of which is lower than that of the hard coat film.

The fifth coating film may be formed of the same material as the second coating film and the fourth coating film.

According to the present invention as set forth above, since the multiple coating layers including the hard coat film formed of AlON are stacked on the base substrate, the substrate for a display device has superior durability and can minimize color shift when applied to a display device In particular, according to the present invention, when the substrate for a display device is applied as a cover substrate of a touchscreen panel, the substrate can withstand millions of touches due to the superior durability thereof, while satisfying required superior optical characteristics due to minimized color shift.

DETAILED DESCRIPTION OF THE INVENTION

Figure 1:
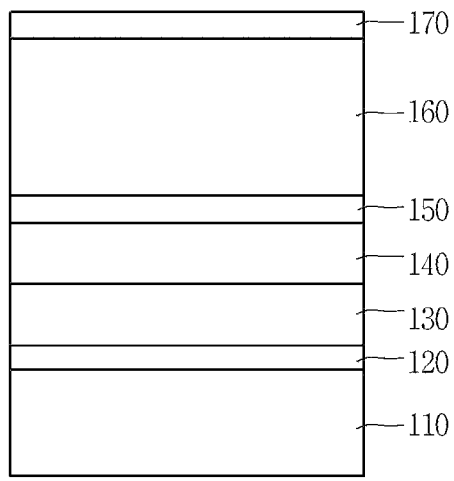
FIG. 1 is a schematic cross-sectional view illustrating a substrate for a display device according to an exemplary embodiment of the present invention.

Reference will now be made in detail to a substrate for a display device according to the present invention, embodiments of which are illustrated in the accompanying drawings and described below, so that a person skilled in the art to which the present invention relates could easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted in the case that they may make the subject matter of the present invention is rendered unclear.

As illustrated in FIG. 1, a substrate 100 for a display device (hereinafter referred to as a "display device substrate") according to an embodiment of the present invention is a substrate that is applicable for a cover substrate of a variety of display devices or a cover substrate of a touchscreen panel which is disposed on the front of a display device. The substrate display device 100 includes a base substrate 110, a first coating film 120, a second coating film 130, a third coating film 140, a fourth coating film 150 and a hard coat film 160.

The base substrate 110 serves to support the above-mentioned coating films. It is preferable that the base substrate 110 be formed of a material that is highly transparent and heat resistant, such that the base substrate 110 is applicable to a display device. In addition, regarding the transparency of the base substrate 110, it is preferable that the visible light transmittance thereof be 80% or greater, and regarding the heat resistance of the base substrate 110, it is preferable that the glass transition temperature thereof be 50° C. or higher. Furthermore, the base substrate 110 can be formed of a molding of an inorganic compound or an organic polymer. Examples of the molding of the inorganic compound may include, but are not limited to, heat strengthened glass and quartz. Examples of the organic polymer may include, but are not limited to, polyethylene terephthalate (PET), acryl, polycarbonate (PC), urethane acrylate (UA), polyester, epoxy acrylate, brominated acrylate and polyvinyl chloride (PVC).

The first coating film 120 is disposed on the base substrate 110. According to an exemplary embodiment of the present invention, the first coating film 120 may be formed of a material, the refractive index of which is higher than that of the second coating film 130. In addition, the first coating film 120 may be formed of the same material as the third coating film 140. Furthermore, the first coating film 120 may be formed of the same material as the hard coat film 160. The first coating film 120 may be formed of AlON, the refractive index of which ranges from 1.8 to 2.3.

In this manner, according to an exemplary embodiment of the present invention, all of the first coating film 120, the third coating film 140 and the hard coat film 160 can be formed of AlON. From among the first coating film 120, the third coating film 140 and the hard coat film 160 formed of AlON, the first coating film 120 is the thinnest. According to an exemplary embodiment of the present invention, the thickness of the first coating film 120 may be 14 nm. However, this is merely an example, and the thickness of the first coating film 120 may vary depending on the thicknesses of the other coating films.

The second coating film 130 is disposed on the first coating film 120. The second coating film 130 is formed of a material, the refractive index of which is lower than that of the first coating film 120, in order to improve optical characteristics such as light extraction. Accordingly, the first and second coating films 120 and 130 form a higher/lower refractivity multilayer structure. The second coating film 130 may be formed of the same material as the fourth coating film 150. According to an exemplary embodiment of the present invention, the second coating film 130 may be formed of a material, the refractivity of which ranges from 1.35 to 1.6, since the first coating film 120 is formed of AlON, the refractive index of which ranges from 1.8 to 2.3. For example, the second coating film 130 may be formed of, but is not limited to, $SiO_2$ or $MgF_2$.

According to an exemplary embodiment of the present invention, the thickness of the second coating film 130 may be 38 nm. However, this is merely an example, and the thickness of the second coating film 130 may vary depending on the thicknesses of the other coating films.

The third coating film 140 is disposed on the second coating film 130. The third coating film 40 is formed of a material, the refractive index of which is higher than that of the second coating film 130. The third coating film 140 may be formed of the same material as the first coating film 120. The third coating film 140 may also be formed of the same material as the hard coat film 160. That is, like the first coating film 120, the third coating film 140 may be formed of AlON, the refractive index of which ranges from 1.8 to 2.3. Accordingly, the first coating film 120, the second coating film 130 and the third coating film 140 form a higher/lower/higher refractivity multilayer structure.

In the first coating film 120, the third coating film 140 and the hard coat film 160 formed of AlON according to an exemplary embodiment of the present invention, the third coating film 140 is thicker than the first coating film 120 but thinner than the hard coat film 160. Since the first coating film 120 is 14 nm thick, the thickness of the third coating film 140 may be 37 nm, greater than the thickness of the first coating film 120.

The fourth coating film 150 is disposed on the third coating film 140. The fourth coating film 150 is formed of a material, the refractive index of which is lower than the third coating film 140. The fourth coating film 150 may be formed of the same material as the second coating film 130. According to an exemplary embodiment of the present invention, the fourth coating film 150 may be formed of the material, the refractive index of which ranges from 1.35 to 1.6, such as $SiO_2$ or $MgF_2$, since the second coating film 130 is formed of this material. Accordingly, the first to fourth coating films 120, 130, 140 and 150 form a higher/lower/higher/lower refractivity multilayer film structure. When the multilayer structure of the different refractivity films is disposed on the path of exiting light, the optical characteristics of the display device can be further improved.

According to an exemplary embodiment of the present invention, the fourth coating film 150 may be formed in a thickness of 13 nm, less than the thickness of the fourth coating film 150, which is 38 nm.

The hard coat film 160 is disposed on the fourth coating film 150. The hard coat film 160 is formed of AlON, the refractive index of which is higher than that of the fourth coating film 150. According to an exemplary embodiment of the present invention, all of the first coating film 120, the third coating film 140 and the hard coat film 160 which form the higher refractivity layers are formed of AlON. This can ensure that the display device substrate 100 has high durability while minimizing color shift, which will be described in more detail later.

Since the hard coat film 160 formed of AlON is the layer that enhances the surface strength of the display device substrate 100, the hard coat film 160 is formed as a thick film that is thicker than the other coating films. Specifically, the hard coat film 160 is formed to be thicker than the first coating film 120 and the third coating film 140 which is formed of the same material, i.e. AlON. It is preferable that the thickness of the hard coat film 160 be at least 10 times the overall thickness of the first to fourth coating films 120, 130, 140 and 150. Accordingly, the thickness of the hard coat film 160 ranges from 1,000 to 3,000 nm and is preferably 2,000 nm.

The display device substrate 100 according to an exemplary embodiment of the invention further includes a fifth coating film 170. The fifth coating film 170 is disposed on the hard coat film 160, and may be formed of a material, the refractive index of which is smaller than that of the hard coat film 160. Here, the fifth coating film 170 may be formed of the same material as the second coating film 130 and the fourth coating film 150. That is, the fifth coating film 170 may be formed of $SiO_2$ or $MgF_2$. According to this exemplary embodiment, the fifth coating film 170 may be formed to have a thickness of 13 nm, the same as the thickness of the fourth coating film 150. The fifth coating film 170 serves as a protection layer for the display device substrate 100.

In this fashion, the display device substrate 100 according to an exemplary embodiment of the invention has the multilayer structure composed of six coating films, including the first coating film 120, the second coating film 130, the third coating film 140, the fourth coating film 150, the hard coat film 160 and the fifth coating film 170 which are sequentially formed on the base substrate 110. Accordingly, the display device substrate 100 has the multilayer structure of the higher/lower/higher/lower/higher/lower refractivity films which are disposed on the path of light exiting the display device. The display device substrate 100 can realize superior optical characteristics based on these differences in refractivity. In addition, the first coating film 120, the third coating film 140 and the hard coat film 160 are formed of AlON, thereby forming the multilayer structure of AlON.

AlON is regarded as a rigid material having superior transmittance. However, AlON has been regarded as unsuitable for use as a cover substrate material of a display device, since it has significant variations in optical characteristics depending on a viewing angle, i.e. color shift occurring depending on the viewing angle.

Accordingly, this exemplary embodiment overcomes the problem of color shift due to AlON by providing the multilayer structure of AlON.

Figure 2:
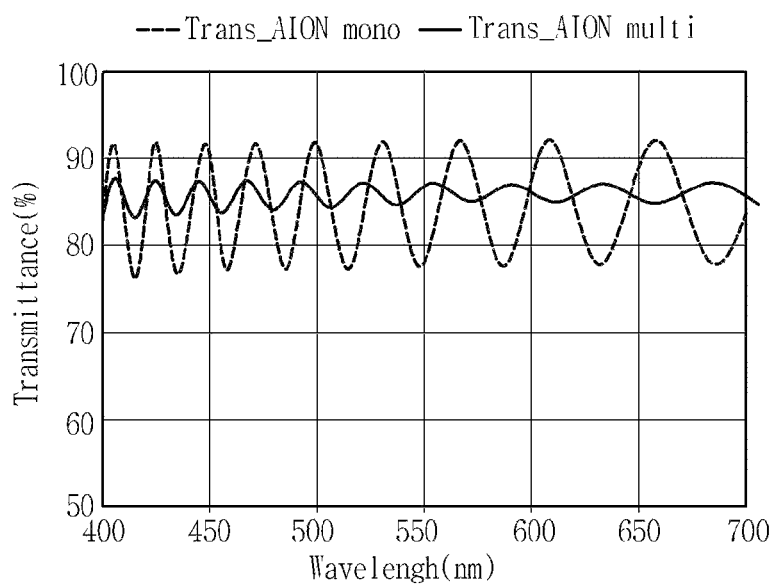
FIG. 2 and FIG. 3 are graphs illustrating levels of transmittance and reflectivity of AlON monolayer and multilayer films that vary according to light wavelengths.
Figure 3:
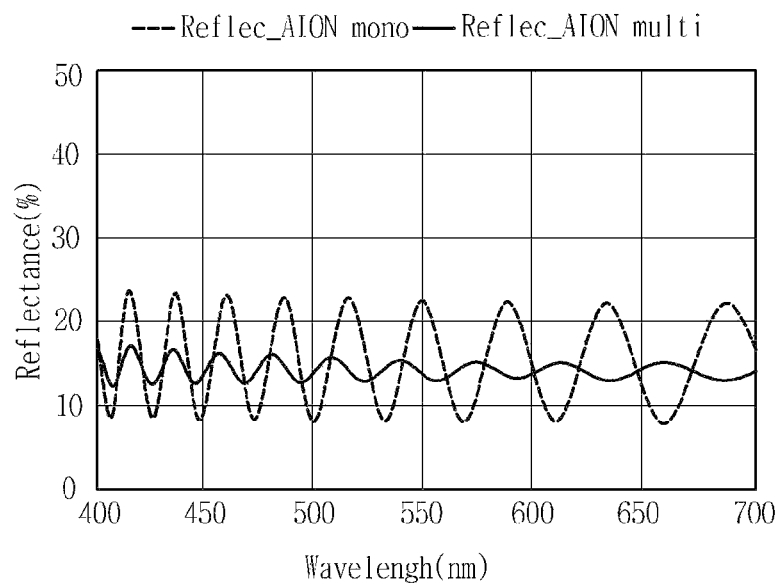

FIG. 2 and FIG. 3 are graphs illustrating the transmittance and reflectivity of AlON monolayer and multilayer films that vary according to light wavelengths. It was appreciated that the monolayer film formed of AlON had significant variations in the transmittance and reflective index according to light wavelengths. These significant variations are factors causing color shift. In contrast, it was appreciated that such variations in the AlON multilayer film significantly decreased from those of the AlON monolayer film. This indicates that color shift was reduced by an amount equal to the decreased variations.

It was appreciated that, when the AlON multilayer film was formed in this fashion, the optical characteristics thereof were improved over those of the AlON monolayer film.

Figure 4:
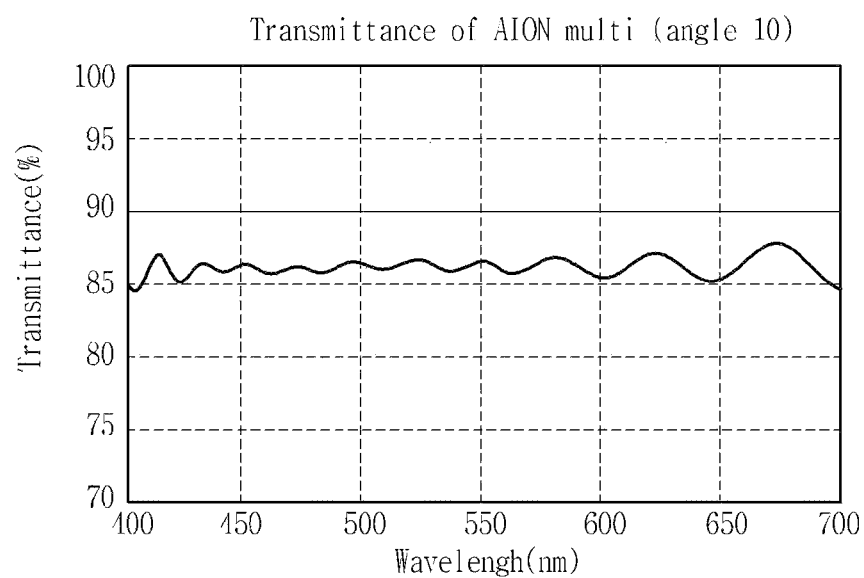
FIG. 4 and FIG. 5 are graphs illustrating levels of transmittance and reflectivity of a substrate for a display device according to an exemplary embodiment of the present invention that vary according to light wavelengths.
Figure 5:
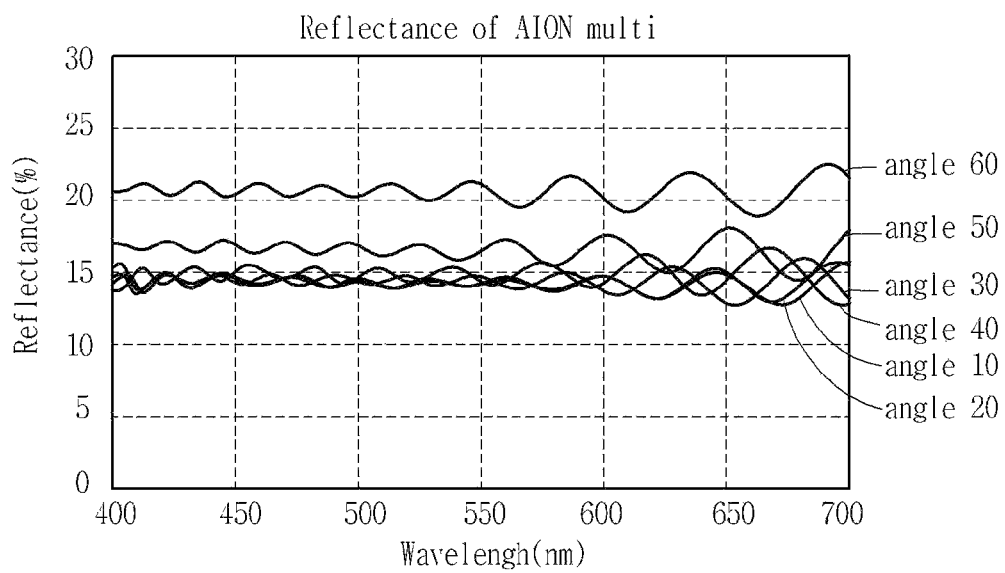

According to this result, as illustrated in the graphs of FIG. 4 and FIG. 5 which show the transmittance and reflectivity of the display device substrate according to an exemplary embodiment of the present invention that vary according to wavelengths, it was appreciated that the display device substrate according to this exemplary embodiment having the AlON multilayer film had significant variations neither in the transmittance according to wavelengths nor in the reflectivity according to wavelengths at a variety of angles.

Figure 6:
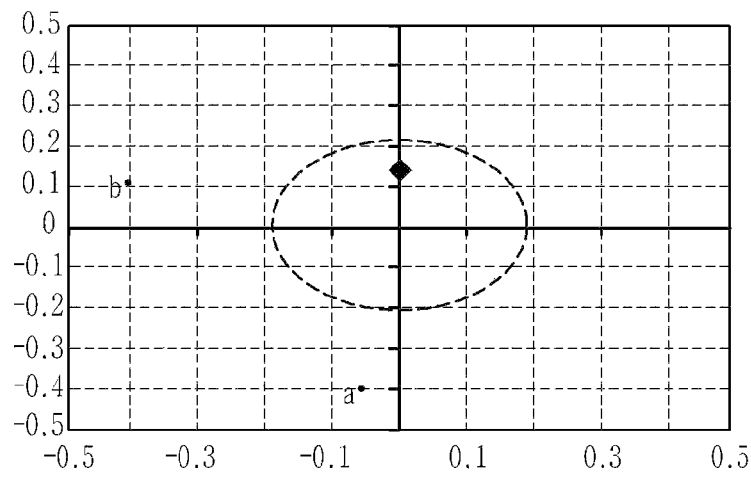
FIG. 6 to FIG. 8 are graphs of the results of a simulation illustrating the optical characteristics of a substrate for a display device according to an exemplary embodiment of the present invention.
Figure 7:
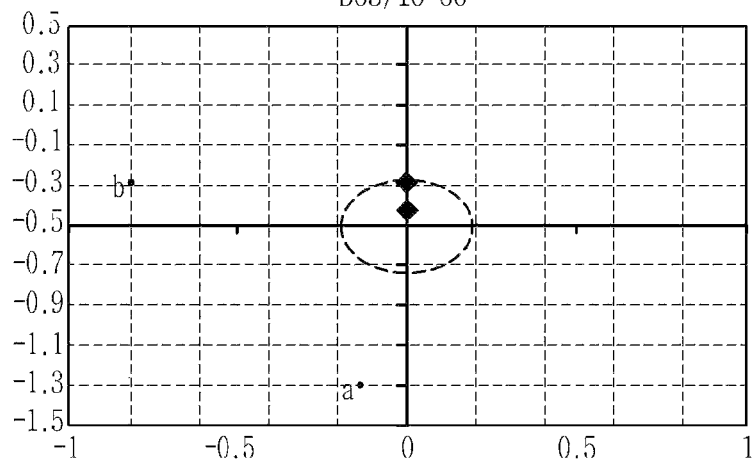
Figure 8:
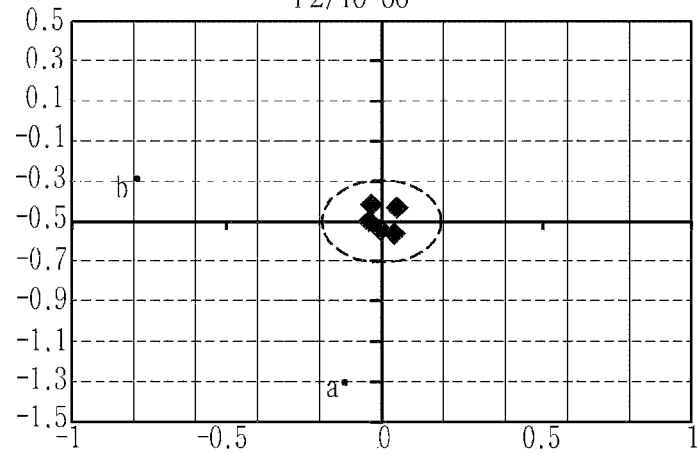
Figure 9:
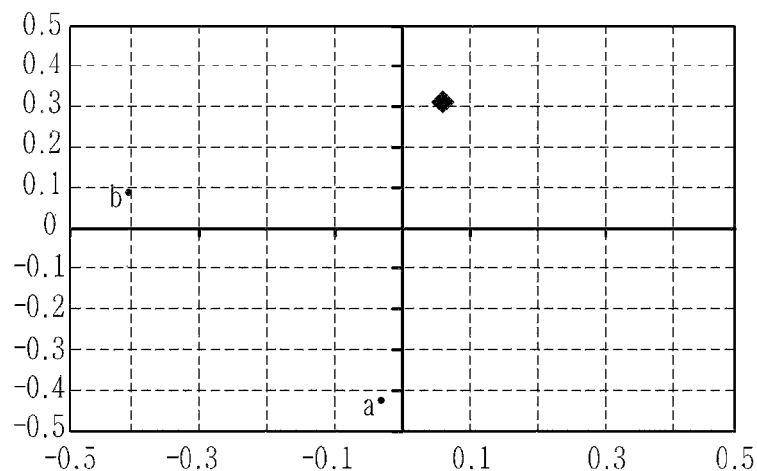
FIG. 9 to FIG. 11 are graphs of the results of a simulation illustrating the optical characteristics of a substrate having an AlON monolayer film.
Figure 10:
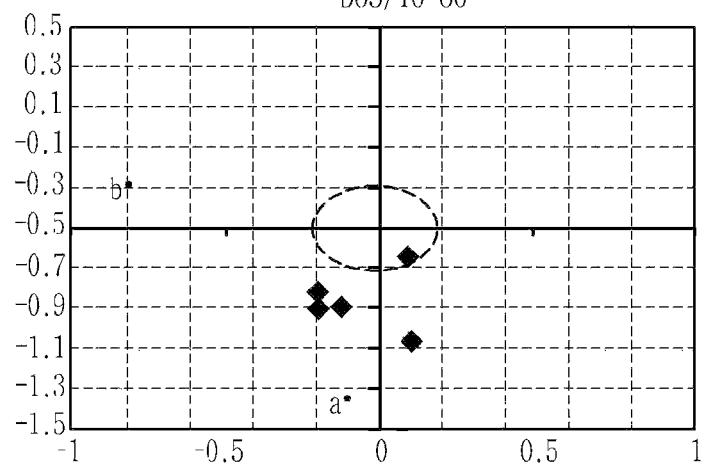
Figure 11:
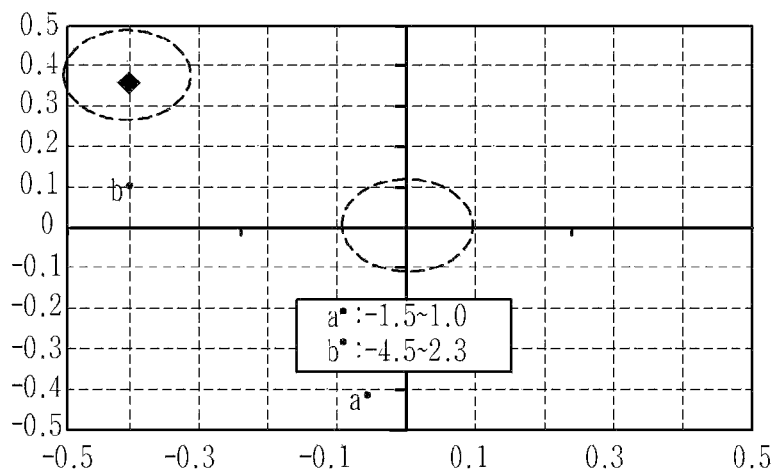

FIG. 6 to FIG. 8 are graphs of the results of a simulation illustrating the optical characteristics of a substrate for a display device according to an exemplary embodiment of the present invention, and FIG. 9 to FIG. 11 are graphs of the results of a simulation illustrating the optical characteristics of a substrate having an AlON monolayer film. As is apparent from the graphs illustrated in FIG. 2 to FIG. 5, it was appreciated that the display device substrate according to this exemplary embodiment had smaller variations in the transmittance and reflectivity of colors a and b than the substrate having the AlON monolayer film.

As apparent from the above-described results, since the display device substrate according to this exemplary embodiment has the multilayer structure composed of the six coating films including the AlON multiple films, the display device substrate has superior durability and small variations in the transmittance and reflectivity at a variety of angles. The display device substrate can consequently minimize color shift when applied to a display device. In particular, when the display device substrate according to this exemplary embodiment is applied as a cover substrate of a touchscreen panel, it can withstand millions of touches due to the superior durability thereof, while satisfying required superior optical characteristics due to minimized color shift.

According to an exemplary embodiment of the invention, the multilayer structure composed of the six coating layers including three AlON layers was illustrated. Since multiple layers formed of AlON can improve the optical characteristics of the display device substrate, the display device substrate may have an eight-layer structure including four AlON layers. However, increasing the number of coating layers leads to a more complicated structure and a decrease in processing ability, which are problematic. In addition, in a process in which AlON and $SiO_2$ are repeatedly stacked on each other, gas must be maintained in an airtight state in each layer, and thus each layer must have parts able to block gas. This consequently causes the problem of the prolonged process line. Above all, although the display device substrate has the eight-layer structure, the optical characteristics of this display device substrate are equal or similar to those of the display device substrate having the six-layer structure. Therefore, it is not required to increase the number of layers of the display device substrate to be greater than six.

Accordingly, it is most preferable in terms of processing, cost, durability and optical characteristics that the display device substrate has the structure having the six coating layers including the three AlON layers.

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

DESCRIPTION OF REFERENCE NUMERALS

100: substrate for display device 100: base substrate

120: first coating film 130: second coating film

140: third coating film 150: fourth coating film

160: hard coat film 170: fifth coating film

What is claimed is:

1. A substrate for a display device comprising:

a base substrate;

a first coating film disposed on the base substrate;

a second coating film disposed on the first coating film, the second coating film being formed of a material, a refractive index of which is lower than that of the first coating film;

a third coating film disposed on the second coating film, the third coating film being formed of a material, a refractive index of which is higher than that of the second coating film;

a fourth coating film disposed on the third coating film, the fourth coating film being formed of a material, a refractive index of which is lower than that of the third coating film, wherein the same material which the second coating film and the fourth coating film are formed of has a refractive index which ranges from 1.35 to 1.6; and a hard coat film disposed on the fourth coating film, the hard coat film being formed of AlON, a refractive index of which is higher than that of the fourth coating film, wherein the first coating film is thinnest and the hard coat film is thickest among the first coating film, the third coating film and the hard coat film, and wherein a thickness of the hard coat film is equal to at least 10 times an overall thickness of the first to fourth coating films.

2. The substrate according to claim 1, wherein the first coating film and the third coating film are formed of the same material.

3. The substrate according to claim 2, wherein the first coating film and the third coating film are formed of AlON.

4. The substrate according to claim 1, wherein the thickness of the hard coat film ranges from 1,000 to 3,000 nm.

5. The substrate according to claim 1, wherein the second coating film and the fourth coating film are formed of the same material.

6. The substrate according to claim 1, further comprising a fifth coating film disposed on the hard coat film, the fifth coating film being formed of a material, a refractive index of which is lower than that of the hard coat film.

7. The substrate according to claim 6, wherein the fifth coating film is formed of the same material as the second coating film and the fourth coating film.

* * * * *